United States Patent
Matsumoto

(10) Patent No.: US 10,216,595 B2
(45) Date of Patent: Feb. 26, 2019

(54) INFORMATION PROCESSING APPARATUS, CONTROL METHOD FOR THE INFORMATION PROCESSING APPARATUS, AND RECORDING MEDIUM

(71) Applicant: CANON KABUSHIKI KAISHA, Tokyo (JP)

(72) Inventor: Akihiro Matsumoto, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/015,823

(22) Filed: Feb. 4, 2016

(65) Prior Publication Data

US 2016/0232066 A1    Aug. 11, 2016

(30) Foreign Application Priority Data

Feb. 10, 2015   (JP) .................. 2015-024045

(51) Int. Cl.
  *G06F 11/00*   (2006.01)
  *G06F 11/20*   (2006.01)
  *G06F 11/14*   (2006.01)

(52) U.S. Cl.
  CPC ...... *G06F 11/2069* (2013.01); *G06F 11/1441* (2013.01); *G06F 11/2087* (2013.01)

(58) Field of Classification Search
  CPC ............. G06F 11/2069; G06F 11/1441; G06F 3/0619; G06F 3/0683; G06F 3/065; G06F 11/2087

(Continued)

(56) References Cited

U.S. PATENT DOCUMENTS 6,023,584 A * 2/2000 Barton ............... G06F 8/61
  714/704
6,052,797 A * 4/2000 Ofek ............... G06F 11/2064
  709/219

(Continued)

FOREIGN PATENT DOCUMENTS

CN    101872289 A    10/2010
CN    101963926 A     2/2011
JP    H03259346 A    11/1991

OTHER PUBLICATIONS

Mogi, K., & Kitsuregawa, M. (Jun. 1996). Hot mirroring: a method of hiding parity update penalty and degradation during rebuilds for RAID5. In ACM SIGMOD Record (vol. 25, No. 2, pp. 183-194). ACM. (Year: 1996).*

*Primary Examiner* — Yair Leibovich
(74) *Attorney, Agent, or Firm* — Canon USA, Inc., IP Division

(57) ABSTRACT

Even when a main board is replaced, if no change is made to a connected storage unit, existent mirroring information is obtained to resume mirroring function processing. An information processing apparatus that performs mirroring to store same data in a plurality of storage units includes a first storage unit configured to store mirroring information indicating a state of the mirroring in a memory of a main board, a second storage unit configured to store the mirroring information in a memory of a sub board, a detection unit configured to detect replacement of the main board, and a restoration unit configured to restore the mirroring information stored in the memory of the sub board by the second storage unit in a memory of a replaced main board in accordance with detection of the replacement of the main board by the detection unit.

15 Claims, 7 Drawing Sheets

| MODE | SINGLE/MIRRORING | 409 |
| STATE | MIRROR/DEGRADED/REBUILDING/HALT | 410 |
| MASTER POSITION | SATA PORT A/B | 411 |
| SERIAL A | SERIAL NUMBER OF HDD | 412 |
| SERIAL B | SERIAL NUMBER OF HDD | 413 |
| IDENTIFICATION INFORMATION | RAID CONTROL UNIT INDIVIDUAL IDENTIFICATION DATA | 414 |
| DETERMINATION INFORMATION | DETERMINATION DATA X | 415 |
| OTHERS | OTHERS | 416 |

409, 410: MIRRORING INFORMATION P
412, 413: HDD SERIAL NUMBER P

(58) Field of Classification Search
USPC .......................................................... 714/6.23
See application file for complete search history.

(56) References Cited

U.S. PATENT DOCUMENTS

| | | | | |
|---|---|---|---|---|
| 7,143,249 | B2* | 11/2006 | Strange | G06F 11/2082 |
| | | | | 711/162 |
| 7,236,987 | B1* | 6/2007 | Faulkner | G06F 17/30067 |
| 7,417,947 | B1* | 8/2008 | Marques | H04L 45/00 |
| | | | | 370/220 |
| 9,244,632 | B1* | 1/2016 | Foley | G06F 3/0689 |
| 2002/0112198 | A1* | 8/2002 | Lim | G06F 11/1417 |
| | | | | 714/6.12 |
| 2004/0078697 | A1* | 4/2004 | Duncan | G06F 11/008 |
| | | | | 714/42 |
| 2004/0133718 | A1* | 7/2004 | Kodama | G06F 3/0605 |
| | | | | 710/74 |
| 2005/0021573 | A1* | 1/2005 | McDermott | G06F 11/2028 |
| 2007/0276983 | A1* | 11/2007 | Zohar | G06F 3/0607 |
| | | | | 711/100 |
| 2008/0022058 | A1* | 1/2008 | Nadathur | G06F 11/1458 |
| | | | | 711/162 |
| 2014/0304469 | A1* | 10/2014 | Wu | G06F 3/065 |
| | | | | 711/114 |

* cited by examiner

FIG. 4A

| MODE | SINGLE/MIRRORING | 401 |
| STATE | MIRROR/DEGRADED/REBUILDING/HALT | 402 |
| MASTER POSITION | SATA PORT A/B | 403 |
| SERIAL A | SERIAL NUMBER OF HDD | 404 |
| SERIAL B | SERIAL NUMBER OF HDD | 405 |
| IDENTIFICATION INFORMATION | RAID CONTROL UNIT INDIVIDUAL IDENTIFICATION DATA | 406 |
| ENCRYPTION FLAG | ENCRYPTION FUNCTION OFF/ON (0/1) | 407 |
| OTHERS | OTHERS | 408 |

401, 402 → MIRRORING INFORMATION Q
403 
404, 405 → HDD SERIAL NUMBER Q

FIG. 4B

| MODE | SINGLE/MIRRORING | 409 |
| STATE | MIRROR/DEGRADED/REBUILDING/HALT | 410 |
| MASTER POSITION | SATA PORT A/B | 411 |
| SERIAL A | SERIAL NUMBER OF HDD | 412 |
| SERIAL B | SERIAL NUMBER OF HDD | 413 |
| IDENTIFICATION INFORMATION | RAID CONTROL UNIT INDIVIDUAL IDENTIFICATION DATA | 414 |
| DETERMINATION INFORMATION | DETERMINATION DATA X | 415 |
| OTHERS | OTHERS | 416 |

409, 410 → MIRRORING INFORMATION P
411
412, 413 → HDD SERIAL NUMBER P

FIG. 4C

| IDENTIFICATION INFORMATION | MAIN BODY DETERMINATION DATA | 417 |
| OTHERS | OTHERS | 418 |

INFORMATION PROCESSING APPARATUS, CONTROL METHOD FOR THE INFORMATION PROCESSING APPARATUS, AND RECORDING MEDIUM

BACKGROUND OF THE INVENTION

Field of the Invention

The present invention relates to an information processing apparatus, a control method for the information processing apparatus, and a recording medium.

Description of the Related Art

A hard disk drive (HDD) is installed as standard equipment in a latest information processing apparatus such as a printing apparatus, in particular, a multi-function printer (MFP). Since the hard disk drive has a mechanical structure, the hard disk drive has a disadvantage of a lower reliability as compared with a semiconductor device. Redundant arrays of independent disks (RAID) are implemented as a device to compensate the disadvantage and construct a highly reliably storage system. The RAID includes several systems. According to RAID-1, two or more HDDs are used to write the same content at the same time, so that it is possible to construct a storage system having a high fault tolerance. The RAID-1 is generally referred to as mirroring. Herein, an operation mode based on one HDD is defined as single, and an operation mode based on two HDDs is defined as mirroring. Pieces of information used for mirroring processing are collectively referred to as mirroring information.

According to Japanese Patent Laid-Open No. 3-259346, the mirroring information and partner's HDD information (such as a serial number) are recorded in mutual HDD fixed areas in a multiplexing manner. A configuration is adopted in which, when the mirroring information is updated during the operation, the recorded information in the HDD fixed areas is also updated in both of the HDDs.

When the mirroring information is lost due to a failure that has occurred during the mirroring mode operation, even if a part where the failure has occurred is recovered, a normal mirroring state before the failure is not restored.

For example, in a case where an on-board RAID control-IC (integrated circuit) is installed on a main board, the mirroring information may be lost due to a failure in the main board in some cases. In this case, even when the main board is replaced, the normal mirroring state before the failure is not restored. This means that there is a probability that at least part or all of user data in the HDD may be lost.

SUMMARY OF THE INVENTION

The present invention has been made in view of the above-described problems, and the present invention provides a method in which, even when a main board is replaced, backed-up mirroring information is obtained, and mirroring function processing can be resumed.

An information processing apparatus that addresses the above-described problem according to an aspect of the present invention includes the following configuration.

That is, the information processing apparatus includes: a controller configured to perform mirror processing on a plurality of storage units, the controller being installed on a main board; a communication unit configured to communicate with a sub board that performs predetermined processing, the communication unit being installed on the main board; a first writing unit configured to write information for identifying the respective storage units obtained from the respective storage units and mirror information for specifying the mirror processing in a first memory; a second writing unit configured to write the mirror information written in the first memory and the information for identifying the respective storage units in a second memory; a determination unit configured to determine whether or not replacement of the main board is executed on the basis of the mirror information written in the first memory; when it is determined that the replacement of the main board is executed, information for identifying the respective storage units obtained by a replaced controller from the respective storage units is matched with the information for identifying the respective storage units stored in the second memory; and a third writing unit configured to write, when it is determined that the information for identifying the respective storage units obtained by the replaced controller is matched with the information for identifying the respective storage units stored in the second memory, the mirror information obtained from the second memory and the information for identifying the respective storage units in the first memory by the replaced controller.

According to the aspect of the present invention, even when the main board is replaced, the backed-up mirroring information is obtained, and it is possible to resume the mirroring function processing.

Further features of the present invention will become apparent from the following description of exemplary embodiments with reference to the attached drawings.

BRIEF DESCRIPTION OF THE DRAWINGS

FIG. 4A, FIG. 4B, and FIG. 4C illustrate data stored in memories of the respective boards.

DESCRIPTION OF THE EMBODIMENTS

Next, exemplary embodiments of the present invention will be described with reference to the drawings.
Descriptions of System Configuration

First Exemplary Embodiment

Figure 1:
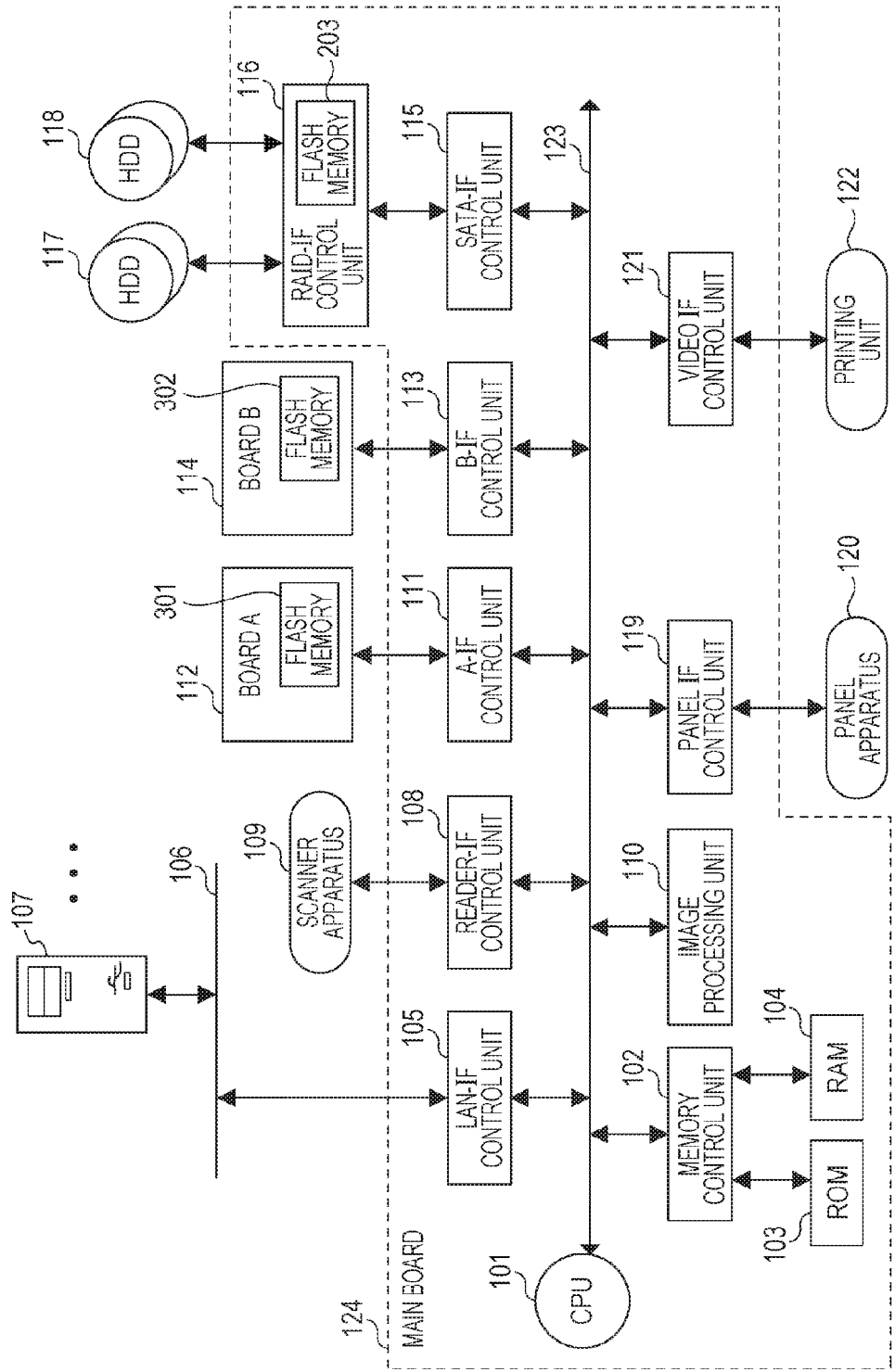
FIG. 1 is a block diagram illustrating an example information processing apparatus.

FIG. 1 is a block diagram illustrating an example information processing apparatus according to the present exemplary embodiment. A RAID-IF control unit 116 that will be described below is provided as a controller configured to perform mirror processing in a plurality of HDDs (storage units) on a main board of the information processing apparatus according to the present exemplary embodiment. Furthermore, an A-IF control unit 111 and a B-IF control unit 113 configured to communicate with a board A 112 and a board B 114 functioning as sub boards that perform predetermined processing are installed on the main board. The information processing apparatus includes an image forming apparatus and a multi-function image forming apparatus.

In FIG. 1, a central processing unit (CPU) 101 performs a system control and various arithmetic processing. A memory control unit 102 performs input and output control with respect to various memory devices and a direct memory access (DMA) control. A read only memory (ROM) 103 is a read dedicated memory represented by a flash memory. The ROM 103 stores a basic input/output system (BIOS) program, a control parameter, and the like. When the flash memory is connected, on-board rewriting can also be performed.

A random access memory (RAM) 104 is a rewriting dedicated memory represented by a double-data-rate (DDR) memory. The RAM 104 is used for a work area of the program, a storage area of printing data, and the like. A LAN-IF control unit 105 performs interface to a local area network 106 connected to a printing apparatus.

In general, the LAN-IF control unit 105 corresponds to Transmission Control Protocol/Internet Protocol (TCP/IP). The LAN-IF control unit 105 is connected to a network corresponding device such as an external host computer 107 via a network cable and can perform printing via a network. The LAN-IF control unit 105 can also be connected to the internet via a router. A reader-IF control unit 108 performs control on a communication with a scanner apparatus 109.

In the information processing apparatus according to the present exemplary embodiment, a copy function is realized while input image data scanned by the scanner apparatus 109 is printed by a printing unit 122 which will be described below.

An image processing unit 110 performs various image processings on image data taken via the LAN-IF control unit 105 and the reader-IF control unit 108. A panel IF control unit 119 performs control on a communication with a panel apparatus 120.

Although not illustrated in the drawings herein, it is possible to check various settings and states of the printing apparatus by operating a liquid crystal screen display, a button, or the like on the panel as a user interface (UI). A video IF control unit 121 performs control on a command/status communication with the printing unit 122 and transferring of print data.

The printing unit 122 is constituted by a printing apparatus main body, a sheet feeding system, and a sheet discharging system although not illustrated in the drawings herein. The printing unit 122 prints the print data on paper mainly in accordance with command information from the video IF control unit 121.

A control bus, a data bus, and a local bus between arbitrary blocks are collectively referred to as a system bus 123 for descriptive purposes. The system bus 123 includes PCI Express (PCIe) as a representative example.

The A-IF control unit 111 and the B-IF control unit 113 respectively perform input and output control with respect to the board A 112 and the board B 114. The board A 112 and the board B 114 are boards (sub boards) connected to a main board 124 and provided with an arbitrary function. There are no particular restrictions with regard to the board as long as the board has a configuration in which a non-volatile storage device (for example, a flash memory 301 or 302 that will be described below) can be installed as a minimum condition. For example, a board that stores a boot program of a system or the like is exemplified as the board A 112, and a board that stores information of the individual printing apparatus (such as individual identification data or consumable item information) or the like is exemplified as the board B 114. The flash memories 301 and 302 function as a second memory and a third memory.

An SATA-IF control unit 115 constituted as a controller performs data input and output control with respect to a device having an IF in conformity to Serial Advanced Technology Attachment (SATA) standards. The RAID-IF control unit 116 connects a plurality of non-volatile storage devices to each other and performs the RAID processing. The non-volatile storage device includes an HDD, an solid state drive (SSD), and the like.

Herein, according to the present exemplary embodiment, it is assumed that the RAID-IF control unit 116 connects two hard disk drives including an HDD 117 and an HDD 118 to each other and executes the mirroring processing. The RAID-IF control unit 116 is installed on the main board 124 as a RAID control-IC.

Figure 2:
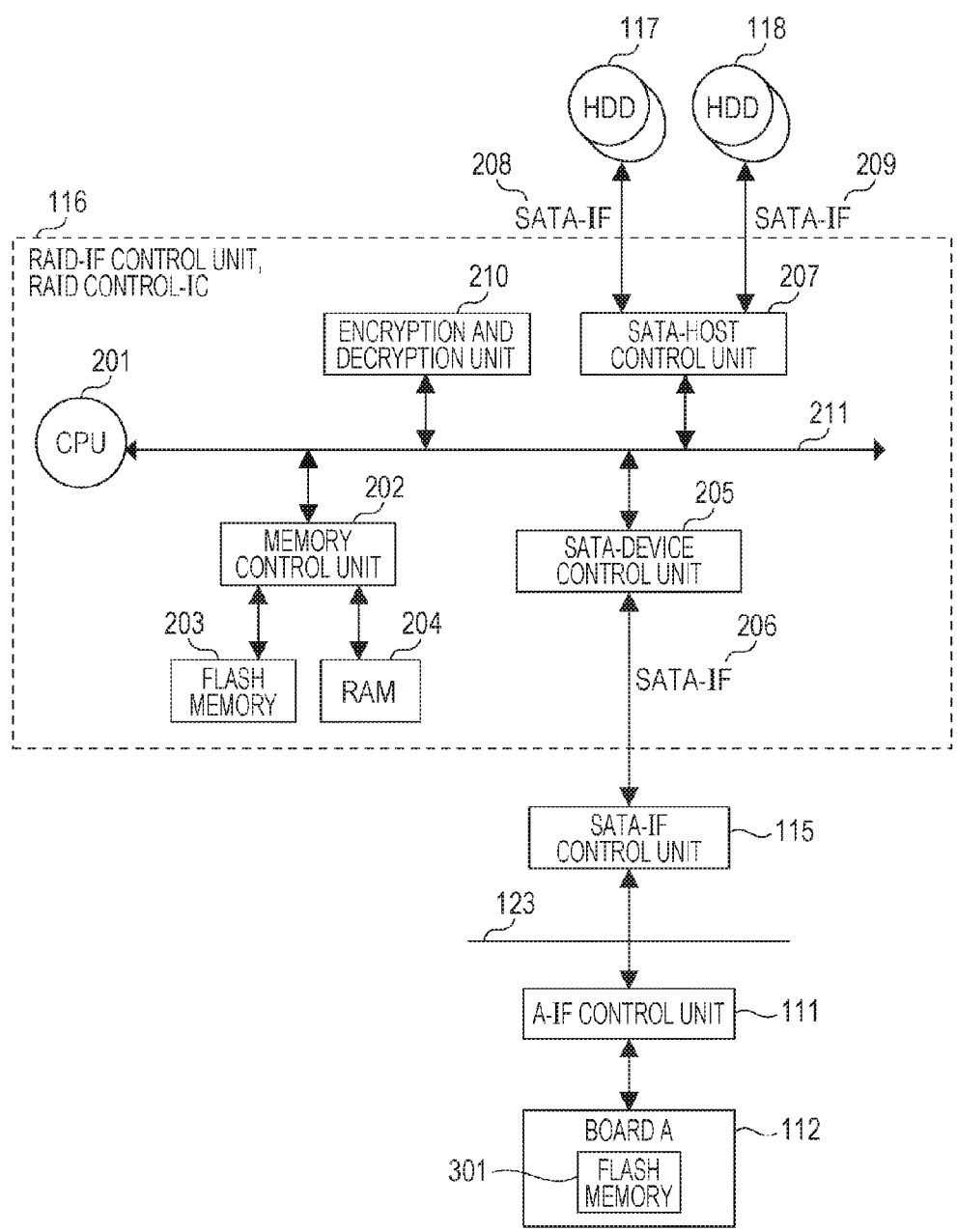
FIG. 2 is an internal system configuration diagram of a RAID-IF control unit.

FIG. 2 is an internal system configuration diagram of the RAID-IF control unit 116 illustrated in FIG. 1. According to the present exemplary embodiment, descriptions will be given while the RAID-IF control unit 116 is located between the SATA-IF control unit 115 and the HDDs 117 and 118, and an SATA-SATA bridge configuration is set as a precondition.

In FIG. 2, a central processing unit (CPU) 201 performs system control and various arithmetic processing. A memory control unit 202 performs input and output control with respect to various memory devices and a direct memory access (DMA) control.

A flash memory 203 is a rewritable non-volatile memory. The flash memory 203 stores a RAID control program, an encryption/decryption program, a control parameter, and the like. A RAM 204 is a rewritable volatile memory in which a high speed access can be realized. The RAM 204 is used as a copy area or a work area for part of the programs stored in the flash memory 203 and a buffer area for data. An SATA-device control unit 205 is connected to the SATA-IF control unit 115 (hereinafter will be referred to as a host) and an SATA-IF 206 corresponding to an interface in conformity to the SATA standards and performs processing on data input and output requests from the host.

An SATA-host control unit 207 is connected to the HDD 117 and the HDD 118 and SATA-IFs 208 and 209 and executes mirroring control. An encryption and decryption unit 210 performs encryption processing in response to a writing data request from the host and decryption processing in response to a reading data request. An encryption algorithm includes Advanced Encryption Standard (AES) representing a common key cryptosystem and the like. A control bus, a data bus, and a local bus between arbitrary blocks are collectively referred to as a system bus 211 for descriptive purposes.

Figure 3:
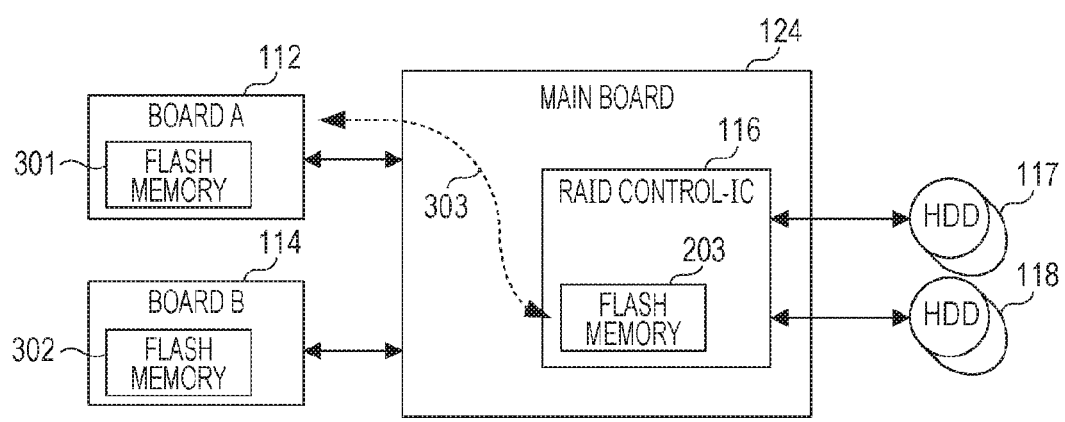
FIG. 3 illustrates a connection configuration of respective boards and HDDs.

FIG. 3 illustrates a connection configuration of the respective boards and the HDDs illustrated in FIG. 1. Descriptions will be given of a connection relationship and role definitions of the respective boards according to the present exemplary embodiment.

In FIG. 3, the on-board RAID-IF control unit (RAID control-IC) 116 is installed on the main board 124, and the HDDs 117 and 118 are connected to the on-board RAID-IF control unit 116. The RAID-IF control unit 116 also includes the built-in flash memory 203. Herein, FIG. 3 illustrates a mode in which the flash memory 203 is built in the IC, but of course, a configuration may be adopted in which the flash memory 203 functioning as a first memory is connected to an external part of the IC as an external memory. The RAID-IF control unit 116 executes mirroring processing on the two HDDs 117 and 118.

Herein, the mirroring processing will be described.

According to the present exemplary embodiment, in an example of mirroring using a plurality of storage units such as, for example, two HDDs, one of the HDDs is set as a master HDD, and the other storage unit is set as a back-up HDD. At the time of reading processing, data is read out from the master HDD, and at the time of writing processing, data is written to both of the HDDs. In general, states of the mirroring processing basically include four states.

The four states are as follows. In a mirror state, the two HDDs are normally operated. In a degraded state, one of the HDDs fails to function properly, and the operation continues while the normal HDD is set as the master. Furthermore, in a rebuilding state, copy processing from the master is performed on a back-up HDD that has replaced the faulty HDD in the degraded state. Finally, in a halt state, accesses are not allowed to the two HDDs due to some reason.

Specific contents of mirroring information include, the mode information described above, master position information, state information, and the like. It should be noted that it is sufficient when the mirroring information includes at least one of the mode information, the master position information, and the state information. In addition, the mirroring information and an HDD serial number may be updated at random times during the mirroring mode operation.

The RAID-IF control unit 116 holds a parameter used for the mirroring processing in the flash memory 203. The CPU 101 of the main board 124 can read out and write various pieces of data held in the flash memory 203 inside the RAID-IF control unit 116. Herein, a structure in which the contents of the flash memory 203 inside the RAID-IF control unit 116 can be read out and written with respect to the CPU 101 will be described.

Although not illustrated herein, a write system extended command and a read system extended command are defined between the CPU 101 of the main board 124 and the CPU 201 in the RAID-IF control unit 116 which can be recognized by both of the CPUs. In a case where data is desired to be written in the flash memory 203, the CPU 101 transmits the write system extended command and written data accompanied by this command to the CPU 201 via the SATA-IF 206. The CPU 201 that has received the written data writes the received data in a predetermined position of the flash memory 203 corresponding to the extended command.

In a case where the reading from the flash memory 203 is desired to be performed, the CPU 101 transmits the read system extended command to the CPU 201 via the SATA-IF 206. The CPU 201 that has received the reading request reads out desired data from a predetermined position of the flash memory 203 corresponding to the extended command and transmits data read out as a status with respect to the read system extended command to the CPU 101 via the SATA-IF 206. In the following descriptions, to avoid redundancy, reading and writing by the CPU 101 with respect to the flash memory 203 inside the RAID-IF control unit 116 will be simply represented as reading and writing.

The flash memory 301 is installed on the board A 112, and reading and writing with respect to the main board 124 can be performed via the A-IF control unit 111. The CPU 101 of the main board 124 performs processing of writing the various pieces of data read out from the flash memory 203 to the flash memory 301 on the board A 112 and can hold the data as recovery data 303 when the failure of the main board 124 occurs.

Similarly, the flash memory 302 is installed on the board B 114, and reading and writing with respect to the main board 124 can be performed via the B-IF control unit 113. The CPU 101 of the main board 124 performs the writing processing such that unique (individual) data of the printing apparatus main body can be stored in the flash memory 302 of the board B 114.

Details of the data stored in the flash memories 203, 301, and 302 will be described with reference to FIG. 4A, FIG. 4B, and FIG. 4C.

FIG. 4A illustrates a parameter list written in the flash memory 203 built in the RAID-IF control unit 116. From the top, mode information 401 indicates whether the operation mode is single (one HDD) or mirroring (two HDDs). State information 402 indicates one of internal states among the four states (mirror/degraded/rebuilding/halt) as the mirroring information for identifying the mirror processing.

Master position information 403 indicates which port is at the master position among SATA ports A/B to which the two hard disk drives are connected. A serial A 404 and a serial B 405 indicate HDD serial numbers respectively obtained from the HDDs. According to the present exemplary embodiment, the serial A 404 is assigned to the HDD 117, and the serial B 405 is assigned to the HDD 118. Individual identification data 406 indicates unique identification data unique to the individual IC of the RAID-IF control unit 116. An encryption flag 407 is a control flag of OFF/ON with regard to an encryption function. The encryption flag 407 can be set by the CPU 101 of the main board 124. Others 408 indicate that stored data other than the above-described data also exists.

FIG. 4B illustrates a parameter list of the recovery data 303 stored in the flash memory 301 installed on the board A 112. Since descriptions of information 409 to 413 and 416 of the flash memory 301 are the same as those on the information 401 to 405 and 408 of the flash memory 203, the descriptions thereof will be omitted.

The information 401 to 405 held in the flash memory 203 of the RAID-IF control unit are backed up in the information 409 to 413 of the flash memory 301 as the recovery data 303. It should be noted that, to clarify which one of the flash memories 203 and 301 the information corresponds to, it is set that "P" is added to the end of the name on the flash memory 301 side, "Q" is added to the end of the name on and the flash memory 203 to make a distinction with regard to the parameters having the same name. Determination data X 415 is used for a determination condition on whether or not the restoration processing of restoring the mirroring information to the RAID-IF control unit 116 is performed. A detail thereof will be described below with reference to a different drawing.

FIG. 4C illustrates a parameter list stored in the flash memory 302 installed on the board B 114. Main body identification data 417 stores main body identification information with which the printing apparatus main body can be individually identified. Information unique to the individual such as the consumable item information is recorded in others 418.

Subsequently, the restoration processing of the mirroring information will be described which is performed after the main board 124 fails to function properly during the operation in the mirroring mode and is replaced.

Figure 5:
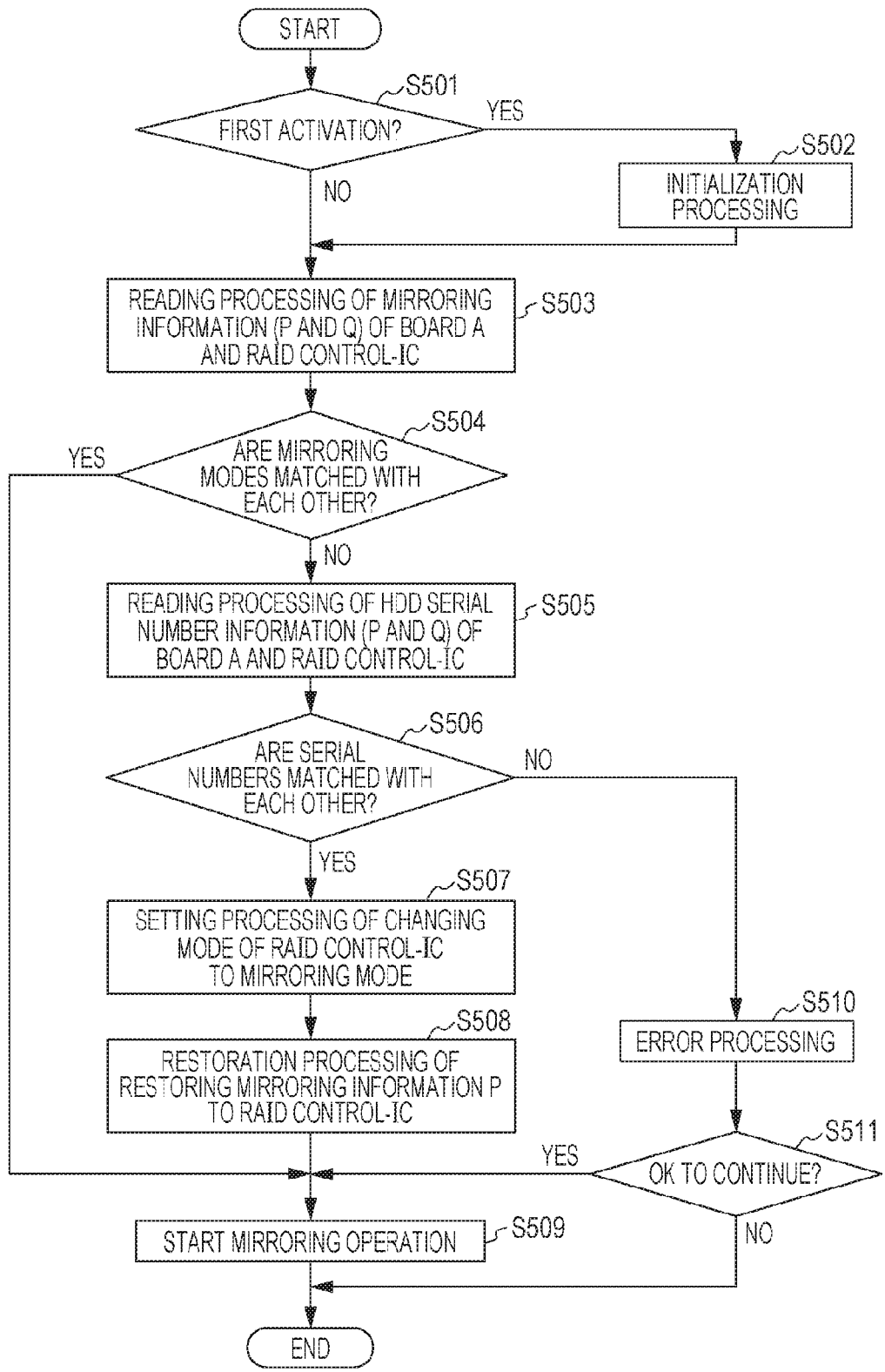
FIG. 5 is a flow chart illustrating a control method for the information processing apparatus.

FIG. 5 is a flow chart illustrating a control method for the information processing apparatus according to the present exemplary embodiment. The present example corresponds to an example of the restoration processing of restoring the mirroring information to the RAID-IF control unit 116. The respective steps can be realized by executing the stored control program by the CPU 101.

In 501, the CPU 101 determines whether this activation is the first activation after a power supply of the printing apparatus is turned ON. At this time, in a case where the CPU 101 determines that this activation is the first activation, the processing proceeds to S502. In S502, the CPU 101 executes initialization processing. According to the present exemplary embodiment, the initialization processing is an operation of installing a system into a new main board and is basically executed at the time of shipment or executed once for the first time only after the main board is replaced. Detailed descriptions of the initialization processing will be omitted, but the operation is performed while the operation mode of the printing apparatus is set as the mirroring mode as a precondition.

On the other hand, in a case where the CPU 101 determines in S501 that this activation is not the first activation, and after the initialization processing in S502 is completed, the CPU 101 advances the processing to S503. In S503, the CPU 101 executes the reading processing of reading out mirroring information P 409 to 411 from the board A 112 and mirroring information Q 401 to 403 from the RAID-IF control unit 116.

In S504, the CPU 101 compares mode information (P, Q) 409 and 401 corresponding to one of the mirroring information with each other and determines whether or not the mirroring modes are matched with each other. At this time, in a case where the CPU 101 determines that the mirroring modes are matched with each other, the processing proceeds S509, and the operation in the mirroring mode is started. On the other hand, in S504, in a case where the CPU 101 determines that the mirroring modes are not matched with each other, the processing proceeds to S505.

It should be noted that a mode initial value of the RAID-IF control unit 116 is set as the single mode. In a case where the main board 124 has failed to function properly and been already replaced during the operation in the mirroring mode, the mode information held in the board A 112 is mirroring although the mode of the RAID-IF control unit 116 is single.

Therefore, when it is determined that the comparison result in S504 is NO, this state means that the main board 124 has been replaced.

In S505, the CPU 101 executes reading processing of reading out HDD serial numbers P 412 and 413 from the board A 112 and HDD serial numbers Q 404 and 405 from the RAID-IF control unit 116. In S506, the CPU 101 compares the HDD serial numbers (P, Q) with each other and determines whether or not the HDD serial numbers are matched with each other. At this time, in a case where the CPU 101 determines that the HDD serial numbers are matched with each other, the processing proceeds to S507. In S507, the CPU 101 sets the mode of the RAID-IF control unit 116 from the single mode to the mirroring mode, and the processing proceeds to S508.

At this time, when the RAID-IF control unit 116 recognizes the mirroring mode, the HDD serial numbers Q 404 and 405 are obtained from the HDD 117 and the HDD 118 and saved in a predetermined position of the flash memory 203.

In S508, the CPU 101 executes the restoration processing of restoring the mirroring information P 409 to 411 held in the board A 112 to the RAID-IF control unit 116. Herein, the restoration processing will be specifically described.

The CPU 101 transmits the mirroring information P 409 to 411 read out from the board A 112 to the CPU 201 accompanied by a restoration processing command defined as the write system extended command.

Subsequently, the CPU 201 that has received the restoration processing command executes the writing processing in a previously specified position of the flash memory 203 as the mirroring information Q 401 to 403.

Thereafter, the CPU 201 starts the mirroring processing by using the updated mirroring information Q 401 to 403. When the restoration processing is completed, the processing proceeds to S509, and the operation in the mirroring mode is started.

On the other hand, in S506, in a case where the CPU 101 determines that the HDD serial numbers are not matched with each other, the processing proceeds to S510. In S510, the CPU 101 executes error processing. Hereinafter, an outline of the error processing will be described.

A case where the comparison result in S506 is NO means that one or both of the HDDs connected before the failure are replaced at the same time as the main board replacement. The program alone does not make a determination on whether or the replacement is intentional.

Therefore, the CPU 101 displays an error content on the panel apparatus 120 functioning as a user interface (UI), and a human-oriented determination is made by an administrator, a service person, or the like.

For this reason, in S511, the operator performs the determination on whether or not the operation can be continued, and a result thereof is accepted by the UI. In a case where the CPU 101 determines that the accepted content indicates that the operation can be continued, the processing proceeds to S509. Subsequently, the operation in the mirroring mode is started in S509. In the case of NO, the operation of the printing apparatus is stopped as an error.

For example, in a case where the mirroring state before the failure is degraded, the state is shifted from degraded to rebuilding when the faulty HDD is also replaced at the same time the replacement of the main board 124 due to the failure, and the normal operation can be started.

Next, backup processing of the mirroring information will be described.

Figure 6:
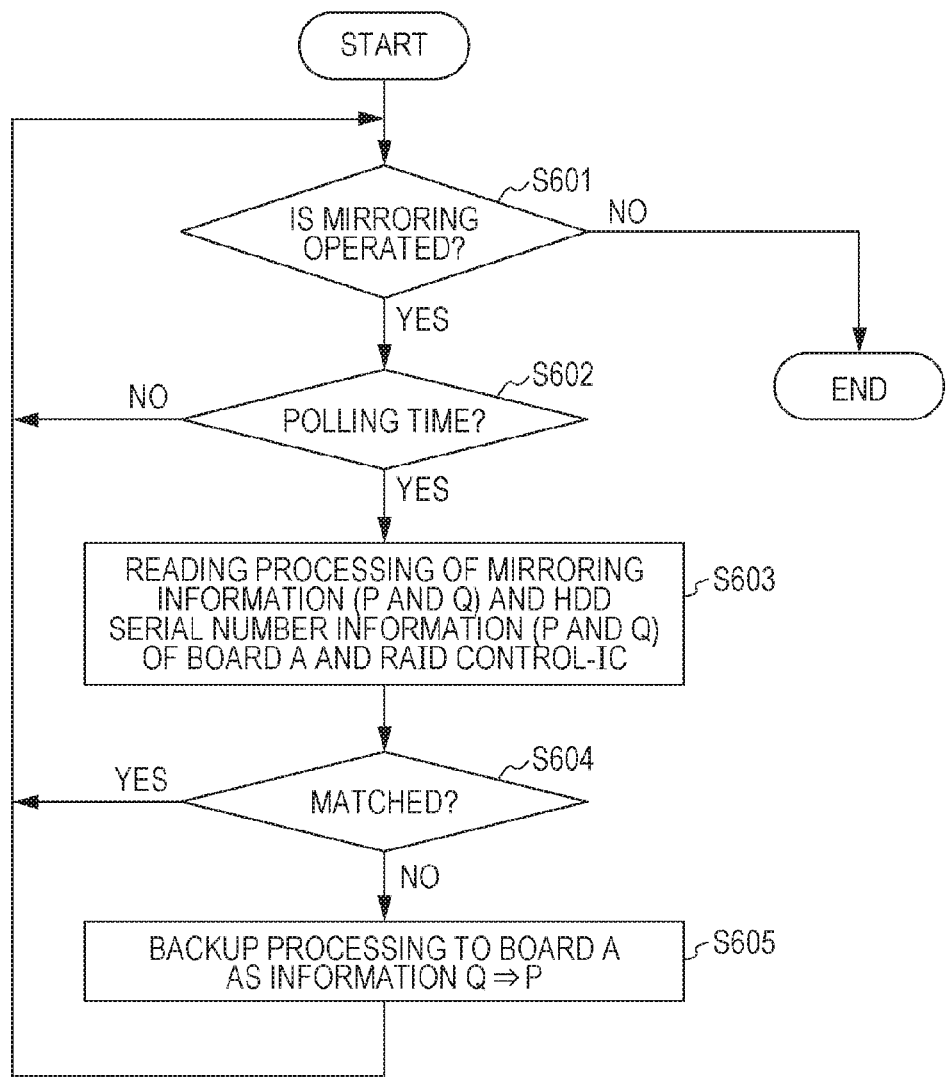
FIG. 6 is a flow chart illustrating the control method for the information processing apparatus.

FIG. 6 is a flow chart illustrating a control method for the information processing apparatus according to the present exemplary embodiment. The present example relates to a backup processing example of the mirroring information. The respective steps are realized while the CPU 101 executes the stored control program.

In S601, the CPU 101 determines whether or not the operation is normally carried out in the mirroring mode. In S601, in a case where the CPU 101 determines that the operation is normally carried out in the mirroring mode, the processing proceeds to S602. In S602, the CPU 101 determines whether or not a predetermined polling time has elapsed. Herein, the polling time (for example, 5 seconds) is previously set.

In the determination in S602, when it is determined that the predetermined polling time has not elapsed, the processing returns to S601 again.

On the other hand, in S602, in a case where the CPU 101 determines that the predetermined polling time has elapsed, the processing proceeds to S603. In S603, the CPU 101 executes the reading processing of reading out the mirroring information P 409 to 411 from the board A 112. Furthermore, the CPU 101 executes the reading processing of reading out the HDD serial numbers P 412 and 413 and the mirroring information Q 401 to 403 from the RAID-IF control unit 116. Moreover, the CPU 101 executes the reading processing of reading out the HDD serial numbers Q 404 and 405, and the processing proceeds to S604. In S604, the CPU 101 compares and determines whether or not the read mirroring information (P, Q) and the read HDD serial numbers (P, Q) are respectively matched with each other.

In S604, in a case where the CPU 101 compares and determines that the read mirroring information (P, Q) and the read HDD serial numbers (P, Q) are respectively matched with each other, the processing returns to S601.

On the other hand, in S604, in a case where the CPU 101 compares and determines that the read mirroring information (P, Q) and the read HDD serial numbers (P, Q) are not respectively matched with each other, the processing proceeds to S605.

In S605, the CPU 101 performs update (backup processing) of information in a predetermined position of the flash memory 301 installed on the board A 112 as the mirroring information P 409 to 411 read out from the RAID-IF control unit 116. Furthermore, the CPU 101 (backup processing) of information in a predetermined position of the flash memory 301 installed on the board A 112 as the HDD serial numbers P 412 and 413, and the processing returns to S601 again.

On the other hand, in a case where the CPU 101 determines in S601 that the operation is not normally carried out in the mirroring mode, the polling processing is interrupted. For example, a case where the printing apparatus shifts to a power saving mode and an access to the hard disk drive is temporarily stopped corresponds to the power saving mode.

As described above, the mirroring information and the HDD serial number may be updated at random times during the mirroring mode operation. In view of the above, while the backup processing flow in S601 to S605 is executed, for example, the update to the latest mirroring information and HDD serial number is realized once in every polling time=5 seconds. Therefore, in the restoration processing described with reference to FIG. 5, the latest information is restored to the RAID-IF control unit 116, and it is possible to restore the mirroring state before the failure. It should be noted that a probability that a failure accidentally occurs during an interval of the polling time (=5 seconds) is considered to be extremely low. In addition, the above-described probability can be set to be close to a negligible level by shortening the polling interval.

Second Exemplary Embodiment

According to the present exemplary embodiment, descriptions will be given of a method with which it is possible to safely and reliably restore the mirroring state before the failure in the mirroring processing accompanying encryption.

Figure 7:
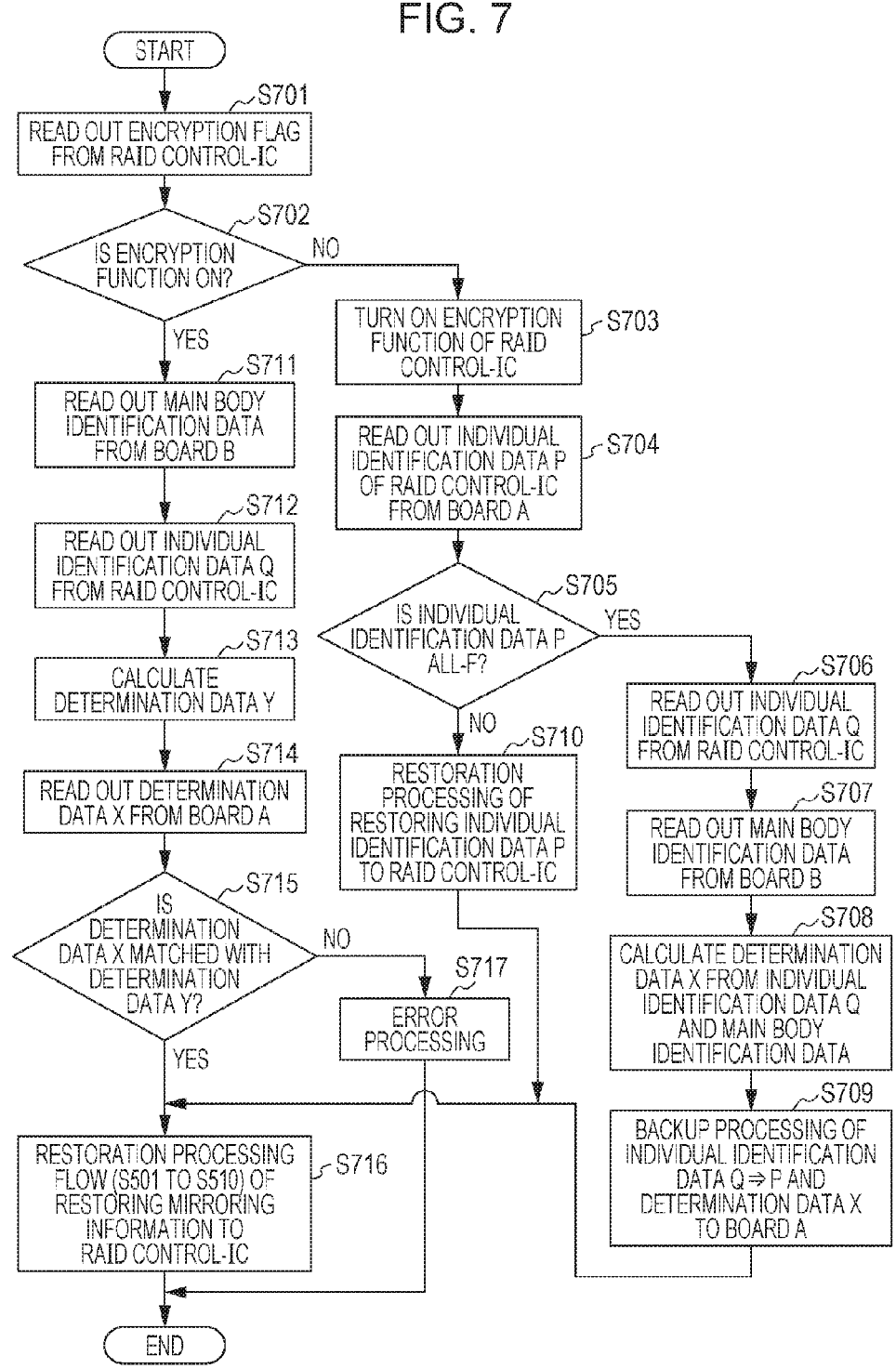
FIG. 7 is a flow chart illustrating the control method for the information processing apparatus.

FIG. 7 is a flow chart illustrating a control method for the information processing apparatus according to the present exemplary embodiment. According to the present exemplary embodiment, descriptions will be given of a restoration processing example of the mirroring information in a case where an encryption function of the RAID-IF control unit 116 is enabled, and the main board replacement is performed. The respective steps are realized while the CPU 101 executes the stored control program. The printing apparatus is operated in the mirroring mode while the encryption function is enabled (ON) as a precondition. In addition, the encryption function is disabled (OFF) in an initial state of the RAID-IF control unit 116.

In S701, the CPU 101 executes reading processing of reading out the encryption flag 407 from the RAID-IF control unit 116 and advances the processing to S702. In S702, the CPU 101 determines whether or not the encryption function is enabled or disabled. In S702, in a case where the CPU 101 determines that the encryption function is disabled (NO), the processing proceeds to S703. In S703, the CPU 101 sets the encryption function of the RAID-IF control unit 116 to be enabled, and the processing proceeds to S704.

At this time, the RAID-IF control unit 116 in which the encryption function is set to be enabled generates individual identification data Q 406 while the CPU 201 executes a predetermined flow. The individual identification data Q 406 is a random bit string having a fixed size generated from physical random numbers and has a value unique to the individual RAID control-IC. Each RAID control-IC generates an encryption key on the basis of the individual identification data Q 406 and executes encryption and decryption processing on the data.

In S704, the CPU 101 performs reading processing of reading out individual identification data P414 of the RAID control unit from the board A 112, and the processing proceeds to S705. In S705, the CPU 101 determines whether a value of the individual identification data P414 is an initial value (for example, ALL-F (specific value)). At this time, in a case where the CPU 101 determines that the value of the individual identification data P414 corresponding to an example of the individual identification information is the initial value, backup processing of the individual identification data Q 406 is started. In S706, the CPU 101 executes the reading processing of reading out the individual identification data Q 406 from the RAID-IF control unit 116, and the processing proceeds to S707.

In S707, the CPU 101 executes the reading processing of reading out the main body identification data 417 from the board B 114, and the processing proceeds to S708. In S708, the CPU 101 calculates the determination data X 415 from the individual identification data Q 406 and the main body identification data 417. Herein, the determination data X 415 is a determination unit configured to link the printing apparatus main body to the RAID-IF control unit one-on-one. At this time, the determination data X 415 is generated, for example, by connecting the main body identification data 417 corresponding to a unique value of the printing apparatus with the individual identification data Q 406 corresponding to a unique value of the RAID control-IC and calculating a hash value thereof.

In S709, the CPU 101 saves the calculated determination data X 415 in a predetermined position of the flash memory 301 installed on the board A 112 as the individual identification data Q 406 and P414, and the processing proceeds to S716.

In S716, the CPU 101 executes the restoration processing flow from S501 to S510 already described with reference to FIG. 5, and the operation in the mirroring mode is started.

On the other hand, in S705, in a case where the CPU 101 determines that the value of the individual identification data P414 is not the initial value, it is determined that the operation is already carried out in a state in which the encryption function is enabled and that the main board is newly replaced, the restoration processing of the individual identification data P414 is started. In S710, the CPU 101 executes the restoration processing on the RAID-IF control unit 116 as the individual identification data PQ 406. In the restoration processing, while the restoration processing command is transmitted to the CPU 201 similarly as in the time of the restoration of the mirroring information, the predetermined position of the flash memory 203 inside the RAID-IF control unit 116 is updated. In S716, the CPU 101 executes the restoration processing flow of the mirroring information, and the operation in the mirroring mode is started.

On the other hand, in a case where the CPU 101 determines in S702 that the encryption function is enabled (YES), the processing in S711 to S715 and S717 are performed to check whether or not an abnormal state other than the main board replacement occurs.

In S711, the CPU 101 executes the reading processing of reading out the main body identification data 417 from the board B 114 and advances the processing to S712. In S712, the CPU 101 executes the reading processing of reading out the individual identification data Q 406 from the RAID-IF control unit 116 and advances the processing to S713. In S713, the CPU 101 calculates determination data Y from the main body identification data 417 and the individual identification data Q 406. Since a calculation method for the determination data Y is similar to the descriptions of S708, the descriptions thereof will be omitted.

In S714, the CPU 101 executes the reading processing of reading out the determination data X 415 from the board A 112 and advances the processing to S715. In S715, the CPU 101 determines whether or not the pieces of the determination data (X, Y) are matched with each other. In S715, in a case where the CPU 101 determines that the pieces of the determination data (X, Y) are matched with each other, the processing proceeds to S716.

In S716, the CPU 101 executes the restoration processing flow of the mirroring information, and the operation in the mirroring mode is started.

On the other hand, in S715, in a case where the CPU 101 determines that the pieces of the determination data (X, Y) are not matched with each other, a case where some failure occurs in the RAID-IF control unit 116 is supposed. In addition, a case where a malicious user deliberately connects another printing apparatus to the RAID system to wiretap the data in the HDD or the like is supposed. In view of the above, in a case where NO is determined in S715, the CPU 101 performs predetermined error processing to stop the operation in the mirroring mode in S717.

It should be noted that the restoration of the mirroring state in the mirroring processing accompanying the encryption particularly needs attention. In a case where the encryption key of the RAID control unit is updated by the replacement of the main board 112, if writing in the mirroring processing is executed in this state, such a defect occurs that consistency with the HDD data before the failure is lost.

In contrast, by executing S701 to S717, it is possible to safely restore the state before the failure even in the mirroring processing accompanying the encryption. In particular, the determination processing in S715 secures safety in two meanings including the safety from the viewpoint of security and the safety with which the mirroring state before the failure can be restored.

It should be noted that the case of the configuration in which the board A 112 and the board B 114 are independently provided has been described, but a configuration may be adopted in which the board A 112 also functions as the board B 114.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-024045, filed Feb. 10, 2015, which is hereby incorporated by reference herein in its entirety.

What is claimed is:

1. An information processing apparatus that performs mirroring to store same data in a plurality of storage units, the information processing apparatus comprising:
   a memory of a main board, the memory being configured to store mirroring information including configuration information about the mirroring in the plurality of storage units;
   a mirroring configuration unit configured to configure mirroring in the plurality of storage units based on the configuration information about the mirroring stored in the memory of a main board;
   a memory of a sub board, the memory being configured to store the mirroring information;
   a detection unit configured to detect replacement of the main board; and
   a restoration unit configured to restore the mirroring information stored in the memory of the sub board in a memory of a replaced main board in accordance with detection of the replacement of the main board by the detection unit,
   wherein the mirroring configuration unit is configured to configure mirroring in a mirroring state in accordance with the configuration information about the mirroring restored in the memory of the replaced main board being information indicating a mirror, and configure mirroring in a degraded state in accordance with the configuration information about the mirroring being information indicating degradation.

2. The information processing apparatus according to claim 1, wherein the detection unit compares the mirroring information stored in the memory of the main board with the mirroring information stored in the memory of the sub board and detects the replacement of the main board on the basis of a comparison result.

3. The information processing apparatus according to claim 2, wherein, when the mirroring information stored in the memory of the main board is matched with the mirroring information stored in the memory of the sub board as a result of the comparison, the detection unit detects the replacement of the main board.

4. The information processing apparatus according to claim 1, wherein the restoration unit restores the mirroring information stored in the memory of the sub board in the memory of the replaced main board in accordance with determination that the plurality of storage units are not replaced in addition to the detection of the replacement of the main board.

5. The information processing apparatus according to claim 4, wherein the memory of the main board and the memory of the sub board both store information for identifying the storage unit, and it is determined that the plurality of storage units are not replaced in a case where the information for identifying the storage unit stored in the memory of the main board is matched with the information for identifying the storage unit stored in the memory of the sub board.

6. The information processing apparatus according to claim 5, wherein the information for identifying the storage unit is a serial number of the storage unit.

7. The information processing apparatus according to claim 1, wherein the mirroring information is information further including at least one of a mode of the mirroring, a master position of the mirroring, and the configuration information restored by the restoration unit.

8. The information processing apparatus according to claim 1, wherein the memory of the main board or the memory of the sub board is a flash memory.

9. The information processing apparatus according to claim 1, wherein the storage unit is a hard disk drive or a solid state drive.

10. The information processing apparatus according to claim 1, further comprising: a printing apparatus; an image forming apparatus; and a multi-function image forming apparatus.

11. A non-transitory computer-readable recording medium storing a program that causes a computer to function as each of the units of the image processing apparatus according to claim 1.

12. An information processing apparatus comprising:
a controller configured to perform mirror processing on a plurality of storage units and encryption processing of encrypting information stored in the respective storage units, the controller being installed on a main board;
a communication unit configured to communicate with a plurality of sub boards that perform predetermined processing, the communication unit being installed on the main board;
a first writing unit configured to write individual identification information for identifying the controller in a first memory and a second memory;
a second writing unit configured to write main body identification information for identifying a main body of the information processing apparatus in a third memory;
a first determination unit configured to determine whether or not the individual identification information obtained from the first memory is a specific value;
a generation unit configured to generate determination data from the individual identification information obtained from the second memory and the main body identification information obtained from the third memory;
a third writing unit configured to write, in a case where it is determined that the individual identification information obtained from the first memory is not the specific value, the obtained individual identification information in the second memory; and
a fourth writing unit configured to write the determination data generated by the generation unit and the individual identification information obtained from the second memory in the first memory, in the case where it is determined that the individual identification information obtained from the first memory is the specific value.

13. The information processing apparatus according to claim 12, further comprising:
a second determination unit configured to determine whether or not the generated determination data written by the fourth writing unit in the first memory is matched with determination data newly generated by the generation unit; and
a fifth writing unit configured to write, when it is determined that the newly generated determination data is matched with the generated determination data, information for identifying respective storage units obtained from the respective storage units and mirror information for specifying the mirror processing in the first memory.

14. The information processing apparatus according to claim 12, further comprising:
a processing unit configured to perform encryption processing on data written in the respective storage units by using an encryption key generated from the individual identification information written in the first memory and decryption processing on the encrypted data read out from the respective storage units.

15. A control method for an information processing apparatus that performs mirroring to store same data in a plurality of storage units, the control method comprising:
storing mirroring information, including configuration information about the mirroring in the plurality of storage units, in a memory of a main board;
mirroring in the plurality of storage units based on the configuration information about the mirroring stored in the memory of the main board;
storing the mirroring information in a memory of a sub board;
detecting replacement of the main board; and
restoring the mirroring information stored in the memory of the sub board in a memory of a replaced main board in accordance with detecting the replacement of the main board,
wherein the mirroring is configured to configure mirroring in a mirroring state in accordance with the configuration information about the mirroring restored in the memory of the replaced main board being information indicating a mirror, and configure mirroring in a degraded state in accordance with the configuration information about the mirroring being information indicating degradation.

* * * * *